(No Model.) 2 Sheets—Sheet 1.

A. R. PECHINEY.
REFRIGERATING TOWER.

No. 400,595. Patented Apr. 2, 1889.

WITNESSES:
F. McArdle
C. Sedgwick

INVENTOR:
A. R. Pechiney
BY Munn & Co
ATTORNEYS.

(No Model.) 2 Sheets—Sheet 2.
A. R. PECHINEY.
REFRIGERATING TOWER.
No. 400,595. Patented Apr. 2, 1889.
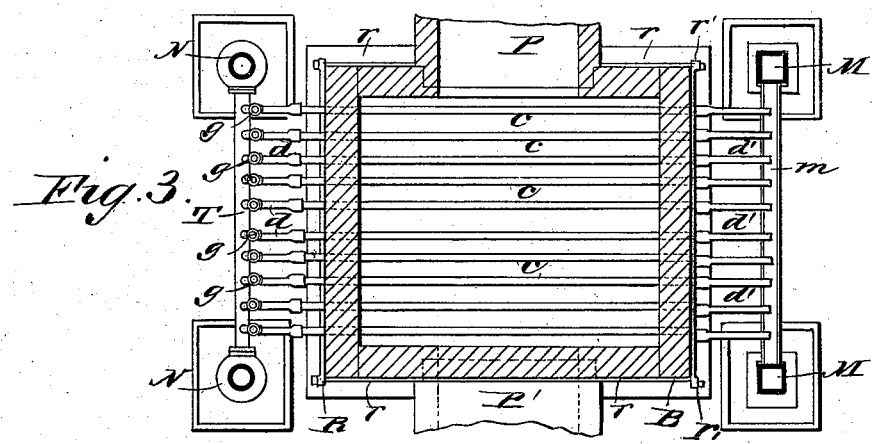
Fig. 3.
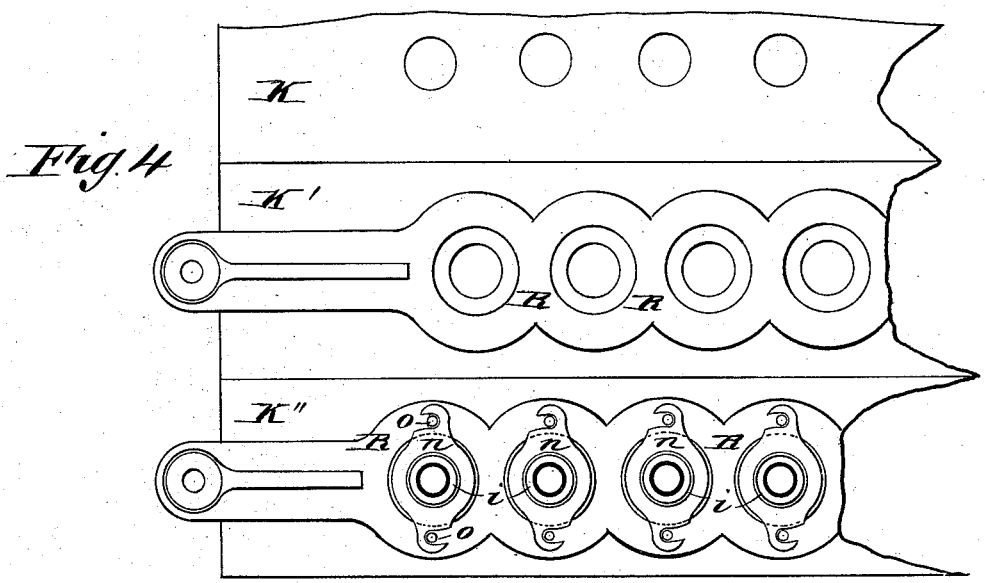
Fig. 4.
Fig. 5.
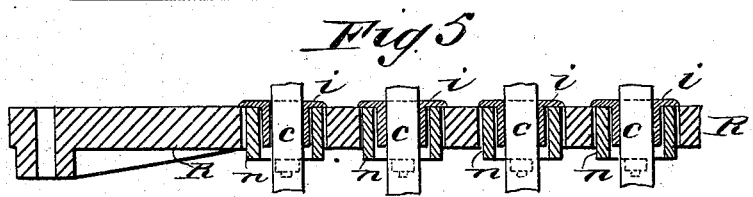
Fig. 6.
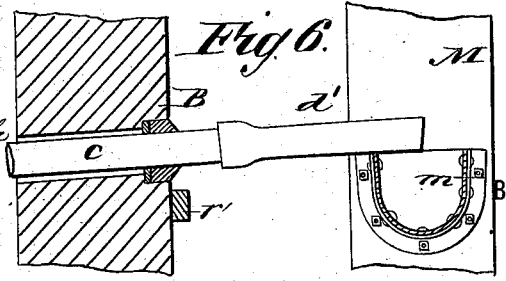
WITNESSES:
F. McArdle
C. Sedgwick
INVENTOR:
A. R. Pechiney
BY Munn & Co.
ATTORNEYS.

UNITED STATES PATENT OFFICE.

ALFRED RANGOD PECHINEY, OF SALINDRES, FRANCE, ASSIGNOR TO WELDON'S CHLORINE PROCESSES COMPANY, (LIMITED,) OF BURSTOW, ENGLAND.

REFRIGERATING-TOWER.

SPECIFICATION forming part of Letters Patent No. 400,595, dated April 2, 1889.

Application filed July 14, 1887. Serial No. 244,291. (No model.) Patented in France April 25, 1885, No. 168,507; in England May 18, 1885, No. 6,066; in Belgium May 25, 1885, No. 69,011; in Germany May 31, 1885, No. 34,397, and in Austria-Hungary August 18, 1885, No. 21,758.

*To all whom it may concern:*

Be it known that I, ALFRED RANGOD PECHINEY, a citizen of France, and residing in Salindres, (Gard,) France, have invented certain new and useful Improvements in Apparatus for Cooling Gases and Vapors, (patented in France April 25, 1885, No. 168,507; in Belgium May 25, 1885, No. 69,011; in England May 18, 1885, No. 6,066; in Austria-Hungary August 18, 1885, No. 21,758, and in Germany May 31, 1885, No. 34,397,) of which the following is a full, clear, and exact description.

This invention relates to an improved apparatus for cooling gases and vapors which are capable of attacking metals. The said apparatus is especially adapted for the cooling of free chlorine and vapor of hydrochloric acid, or of any mixture of either one or both of these bodies with any other body or bodies in the state of gas or vapor. The said apparatus consists, essentially, of a stone tower of square or rectangular horizontal section, in the interior of which tower are arranged, either horizontally or in an inclined position, glass tubes, through which cold water is kept flowing, and in certain details of construction and combinations of parts, as will be hereinafter explained, and specifically pointed out in the claims.

Reference is to be had to the accompanying drawings, forming part of this specification, in which similar letters of reference indicate corresponding parts in all the figures.

Figure 1:
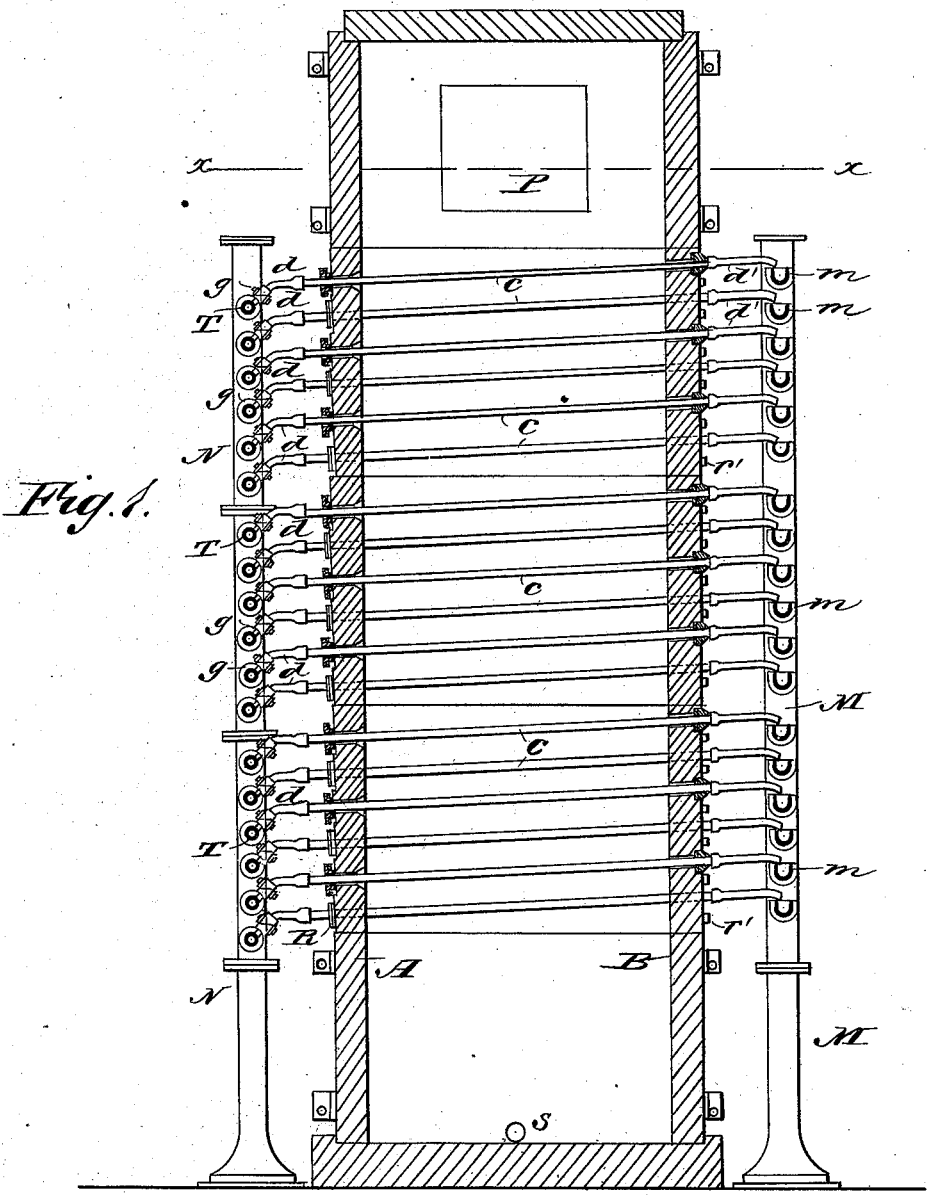
Figure 2:
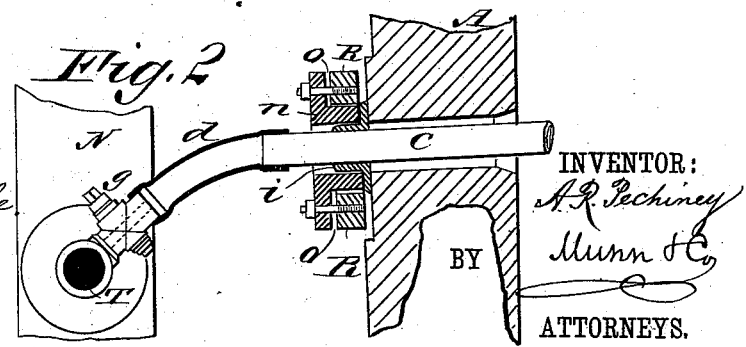

Figure 1 is a vertical sectional elevation of the tower. Fig. 2 is an enlarged view of one end of a glass tube, showing its connection with the water-pipe and the tower. Fig. 3 is a horizontal sectional view of the tower, taken on line $x\ x$ of Fig. 1. Figs. 4, 5, and 6 illustrate certain details of construction, and will be hereinafter more specifically explained.

The tower shown at A B, in the interior of which the glass tubes $c\ c$ are placed, may be constructed after the same manner as the towers in which the vapor of hydrochloric acid which is generated in the first state of the manufacture of soda by the Leblanc process is usually condensed. Two opposite sides of the said tower are each pierced with holes. These holes should preferably be arranged in horizontal rows, those of any one row except the lowest being not immediately above the holes in the row immediately beneath it, but above the spaces between the holes in the row immediately beneath. One extremity of each of the glass tubes $c\ c$ protrudes through one of the holes in the A side of the tower and its other extremity protrudes through the corresponding hole in the opposite or B side of the tower.

On the A side of the tower (which may of course be whichever of its four sides is most convenient in each case) the protruding extremity of each glass tube is connected by a piece of caoutchouc tubing or other equivalent appliance (marked $d\ d\ d$ in Figs. 1, 2, and 3) with one of the tubes or pipes marked T.

The tubes T may be of iron or other convenient material. Water passes into the tubes T from the hollow column N, and then from the tubes T into the glass tubes $c\ c\ c\ c$. On the B side of the tower, or the side of it which is opposite to its A side, the protruding extremity of each glass tube is connected with a piece of caoutchouc tubing, or other equivalent appliance, marked $d'$ in each case. Water which has entered one of the glass tubes from the hollow column N by one of the pipes T, and has traversed the glass tube, passes from that glass tube and is discharged into one of the gutters or conduits $m\ m\ m$.

From the gutters $m\ m\ m$ the water discharged from the glass tubes passes away by the hollow column M.

In order that the glass tubes $c\ c\ c\ c$ may not be liable to break, it is necessary that they should be kept always full of water. This result may be secured either by slightly inclining the glass tubes, as in Fig. 1, placing that extremity of each of them by which water enters it a little lower than that extremity of it by which water is discharged from it; or, if it be preferred that the glass tubes should be placed horizontally, by elevating somewhat above the level of each glass tube, respectively, the caoutchouc tube or other appliance $d'\ d'\ d'$, by which the water which has passed through the said glass tube is discharged into the gutters $m\ m\ m$. When the glass tubes are placed in an inclined position and the mixtures of vapors and gases which the apparatus is employed to cool is one from which an acid liquor condenses during the operation of cooling it, this acid liquor will condense upon the glass tubes and will run along each tube toward its lower extremity, being the extremity of it which is at the A side of the tower, or at the side of the tower at which the cooling-water enters the glass tubes. It is therefore necessary that at that side of the tower the joint between the glass tube and the stone through which it passes should be perfectly tight. A convenient method of making this joint quite tight is illustrated in Figs. 2, 4, and 5.

The section marked K in Fig. 3 represents a front view of a portion of the A side of the tower, showing some of the holes for the passage of the glass tubes $c\ c$. The section marked K' in Fig. 3 shows the same portion of the A side of the tower after the bar or band of iron R R has been placed over the holes in it.

The section marked K'' in Fig. 3 shows the same portion of the A side of the tower after the glass tubes have been inserted and have been tightly jointed to the stone side of the tower by means of the caoutchouc pieces $i\ i$ and cast-iron glands $n\ n$. (See Figs. 2 and 5.)

It will be seen that in the rim bar or band R R there are circular apertures which are larger than the apertures in the stone side of the tower, but the center of each of which coincides with the center of one of the latter. There are as many of these iron bars or bands R R as there are rows of holes in the stone side of the tower. These iron bars or bands R R serve as part of the armature of the tower, each of the iron bars or bands R R being connected by one of its extremities with a tie-rod, $r$, which passes horizontally across one of the two faces of the tower which are at right angles to its A face and by the other of its two extremities with a tie-rod which passes horizontally across the other of the said two faces of the tower, and these two tie-rods being connected with a third tie-rod, $r'$, which passes horizontally across the B face of the tower. (See Fig. 3.)

Fig. 5 represents a horizontal section of the iron bar or band R R in the line of the centers of the apertures in it. It shows the glass tubes, the caoutchouc pieces $i\ i$, and the iron glands $n\ n$. Fig. 2 shows, in enlarged vertical section, the connection of the pipes $c$ with the A side of the tower, and Fig. 6 is a similar view of the connection on the B side of the tower.

It will be seen that upon that extremity of the glass tube $c$ which protrudes through the A side of the tower there is placed a short piece of caoutchouc tubing, $i\ i$, upon which is a caoutchouc flange, which flange comes in contact with the face of the stone through which the tube passes, and is pressed tightly against the face of that stone by the tubular flange of the gland $n\ n$, that tubular flange being pressed tightly against the annular flange of the piece of flanged caoutchouc tubing $i\ i$ by means of screws $o\ o$, passing through the annular flange of the gland $n\ n$ and working into the iron bar or band R R.

The joint between the other extremity of each glass tube $c$ and the stone through which it passes on the B side of the tower may be made simply by means of any cement unattackable by acids. If preferred, however, it may, of course, be made in the same manner as the joints on the A side of the tower.

The gas or vapor or mixture of gas or gases and vapor or vapors to be cooled by this apparatus should, preferably, enter near the top of the tower—for example, at P, Figs. 1 and 3—and the cooled gas or gases or vapor or vapors should preferably pass off from near the bottom of the tower on the opposite side of it, as at P', Fig. 3. Any liquid condensing in the tower will pass out of it by the aperture S, Fig. 1.

It will be evident that if one of the glass tubes $c\ c\ c$ happens to break, the broken tube can be removed and a new one put in its place very readily and without stopping the working of the apparatus. The fact that a tube has broken will be perceived by an increase in the quantity of liquid discharged from S, and which tube it is which has broken will be indicated by water ceasing to issue from that extremity of the broken tube which protrudes through the B side of the tower. The cock $g$ of that tube may then at once be closed and the broken tube removed and a new one substituted for it without interrupting the working of the apparatus.

An apparatus for the cooling of gases and vapors has been proposed and tried, in which apparatus the glass tubes were arranged vertically, the gases or vapors passing through the glass tubes and the cooling-water being applied to the exterior of the glass tubes. This apparatus was not found to be practicable. The apparatus which constitutes the present invention differs from the said previously-proposed apparatus in two very important particulars: First, the gas or gases or vapor or vapors which are to be cooled do not pass through the glass tubes and the glass tubes are not surrounded by water; but what passes through the tubes is the cooling-water, and the gas or gases or vapor or vapors are cooled by being brought into contact with the exterior surfaces of a number of glass tubes through which cold water is continually flowing. Secondly, the glass tubes are not disposed vertically, but either in a horizontal position or in an inclined position, which disposition of them permits that a broken tube can be replaced without stopping the working of the apparatus.

Having thus described my invention, what

I claim as new, and desire to secure by Letters Patent, is—

1. The combination, with the tower, of cooling-tubes extending transversely through the walls thereof, each tube having a separate supply-connection exterior to the outer walls of the tower, whereby any tube may be removed and replaced without interfering with the flow through any other tube, substantially as set forth.

2. The combination, with the tower and the series of cooling-tubes extending transversely through its walls, of a vertical water-supply column outside of the tower, a series of transverse pipes communicating therewith, and separate valved connections leading from a pipe to each tube of the adjacent series, substantially as set forth.

3. The combination, with the tower A B, of the tubes $c$, packing $i$, bar R, and glands $n$, held to the bar R by screws $o$, substantially as described.

4. In an apparatus for cooling gases or vapors, the combination of the following elements, viz: tower A B, tubes $c\ c$, column N, pipes T, stop-cocks $g$, and tubes $d$, substantially as described.

5. In an apparatus for cooling gases and vapors, the combination of the following elements, viz: tower A B, tubes $c\ c$, column N, pipes T, stop-cocks $g$, tubes $d$ and $d'$, and column M, supporting gutters $m$, substantially as described.

6. The combination, with the tower, of the transverse cooling-pipes extending therethrough with their delivery or outlet ends higher than their inlet ends, whereby the pipes when supplied will be always completely filled, substantially as set forth.

ALFRED RANGOD PECHINEY.

Witnesses:
  LOUIS ZUBIEN,
  FRANÇOIS JULIEN RAYMOND.